(12) United States Patent
Muramatsu et al.

(10) Patent No.: US 6,449,011 B1
(45) Date of Patent: *Sep. 10, 2002

(54) VIDEO CAMERA SYSTEM HAVING PANHEAD FOR USE IN VIDEO CONFERENCE OR THE LIKE

(75) Inventors: Mizuki Muramatsu, Tokyo; Hiroyuki Horii; Hideo Kawai, both of Kanagawa-ken, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/034,230

(22) Filed: Mar. 22, 1993

(30) Foreign Application Priority Data

Mar. 27, 1992 (JP) .............................. 4-071193
Jan. 29, 1993 (JP) .............................. 5-034823

(51) Int. Cl.$^7$ ................................. H04N 7/18
(52) U.S. Cl. ............................................. 348/169
(58) Field of Search ........................... 348/13–15, 20, 348/211, 213, 214, 94, 95, 136, 137, 138, 139, 140, 141, 170; 354/70, 99, 222, 223

(56) References Cited

U.S. PATENT DOCUMENTS

| | | | | |
|---|---|---|---|---|
| 4,516,156 A | * | 5/1985 | Fabris et al. .................. 358/85 |
| 4,609,939 A | * | 9/1986 | Kozawa et al. ................ 348/13 |
| 4,758,887 A | * | 7/1988 | Engel et al. ................... 348/15 |
| 4,794,459 A | * | 12/1988 | Moberg et al. ............. 348/211 |
| 4,931,872 A | * | 6/1990 | Stoddard ...................... 348/20 |
| 4,961,211 A | * | 10/1990 | Tsubane et al. ............... 348/13 |
| 4,980,761 A | * | 12/1990 | Natori ......................... 348/15 |
| 4,995,071 A | * | 2/1991 | Weber et al. ................. 379/53 |
| 5,068,735 A | * | 11/1991 | Tuchiya et al. ............. 348/211 |
| 5,077,784 A | * | 12/1991 | Fujita et al. .................. 348/20 |
| 5,079,634 A | * | 1/1992 | Hosono ...................... 348/211 |
| 5,175,616 A | * | 12/1992 | Milgrant ...................... 348/20 |
| 5,187,571 A | * | 2/1993 | Braun et al. ................. 348/14 |
| 5,191,601 A | * | 3/1993 | Ida et al. ...................... 348/14 |
| 5,206,721 A | * | 4/1993 | Ashida et al. ................ 348/15 |
| 5,218,627 A | * | 6/1993 | Corey et al. ................. 348/20 |
| 5,262,869 A | * | 11/1993 | Hong .......................... 348/20 |
| 5,473,368 A | * | 12/1995 | Hart ........................... 348/155 |

* cited by examiner

Primary Examiner—Andy Rao
(74) Attorney, Agent, or Firm—Robin, Blecker & Daley

(57) ABSTRACT

A video camera system is arranged to detect the amount of movement of a video camera, to form image data indicative of the direction of the video camera, and to combine this image data with image data obtained from the video camera. The video camera system is further arranged to combine the camera direction indicating image data with the image data of a wide-angle image obtained from the video camera into data for a display to be made on an auxiliary image plane, and to process the image data of a tele-photo image obtained from the video camera into data for a display to be made on a main image plane.

26 Claims, 14 Drawing Sheets

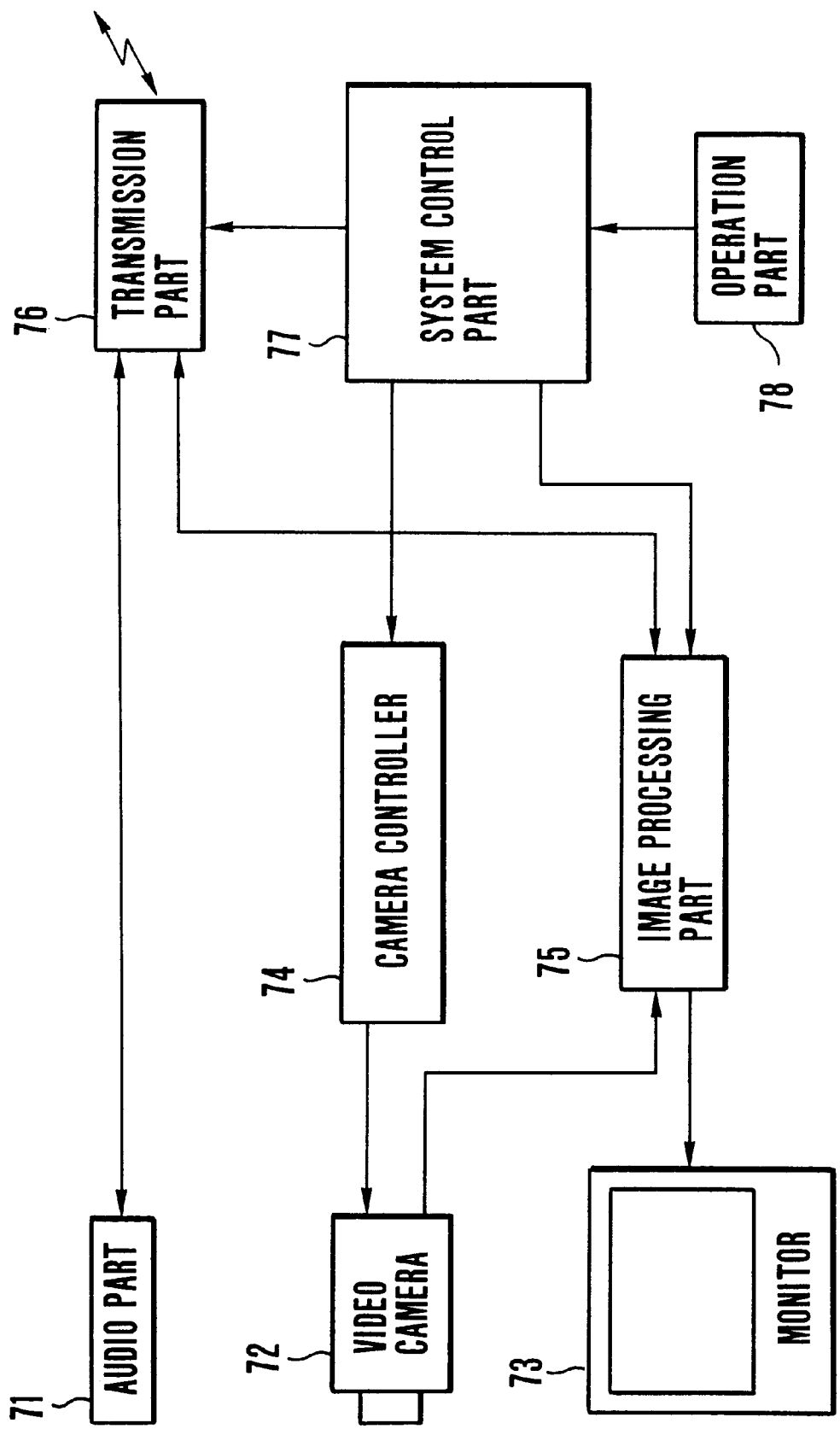

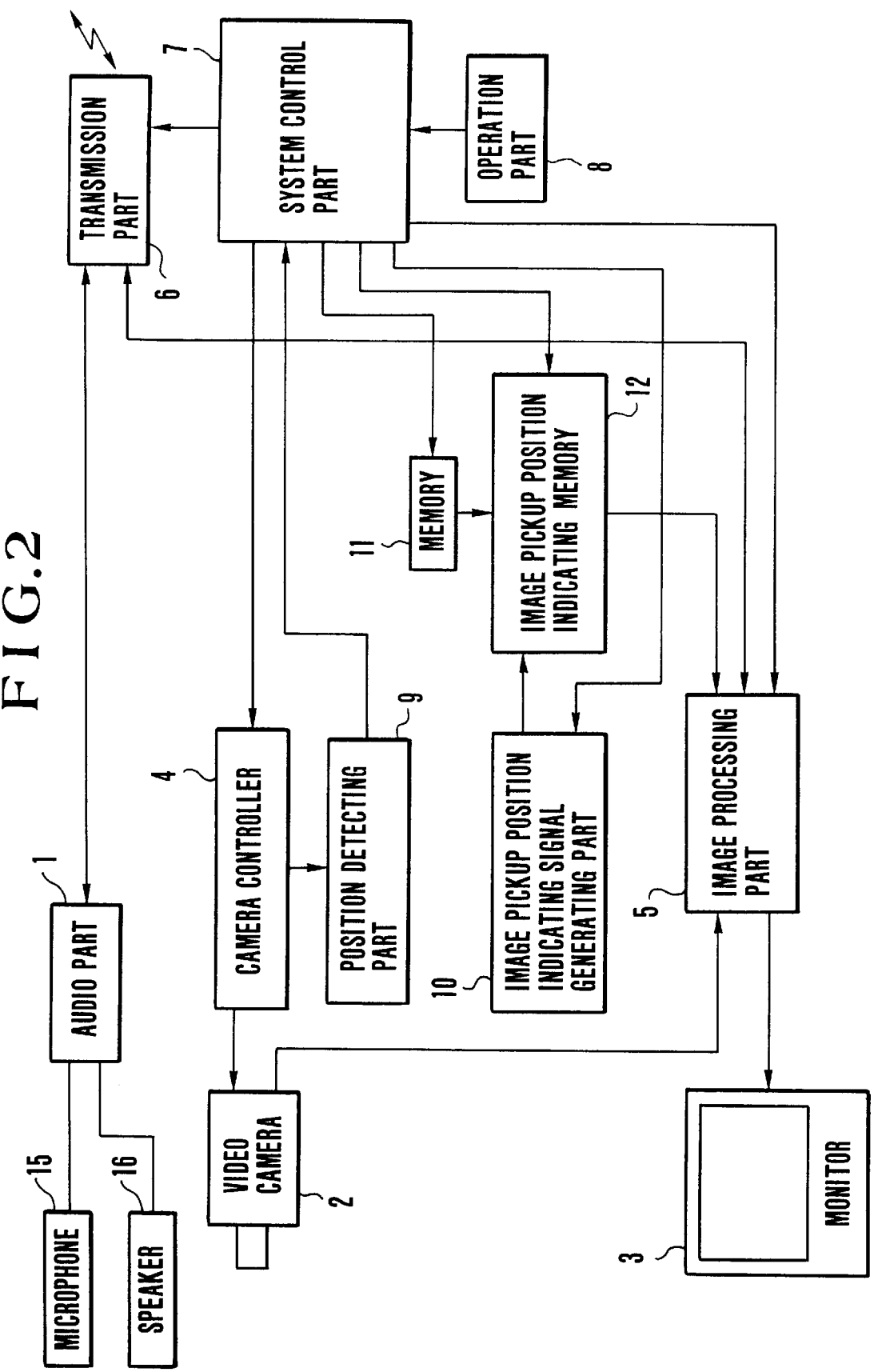

MAIN IMAGE PLANE

AUXILIARY IMAGE PLANE

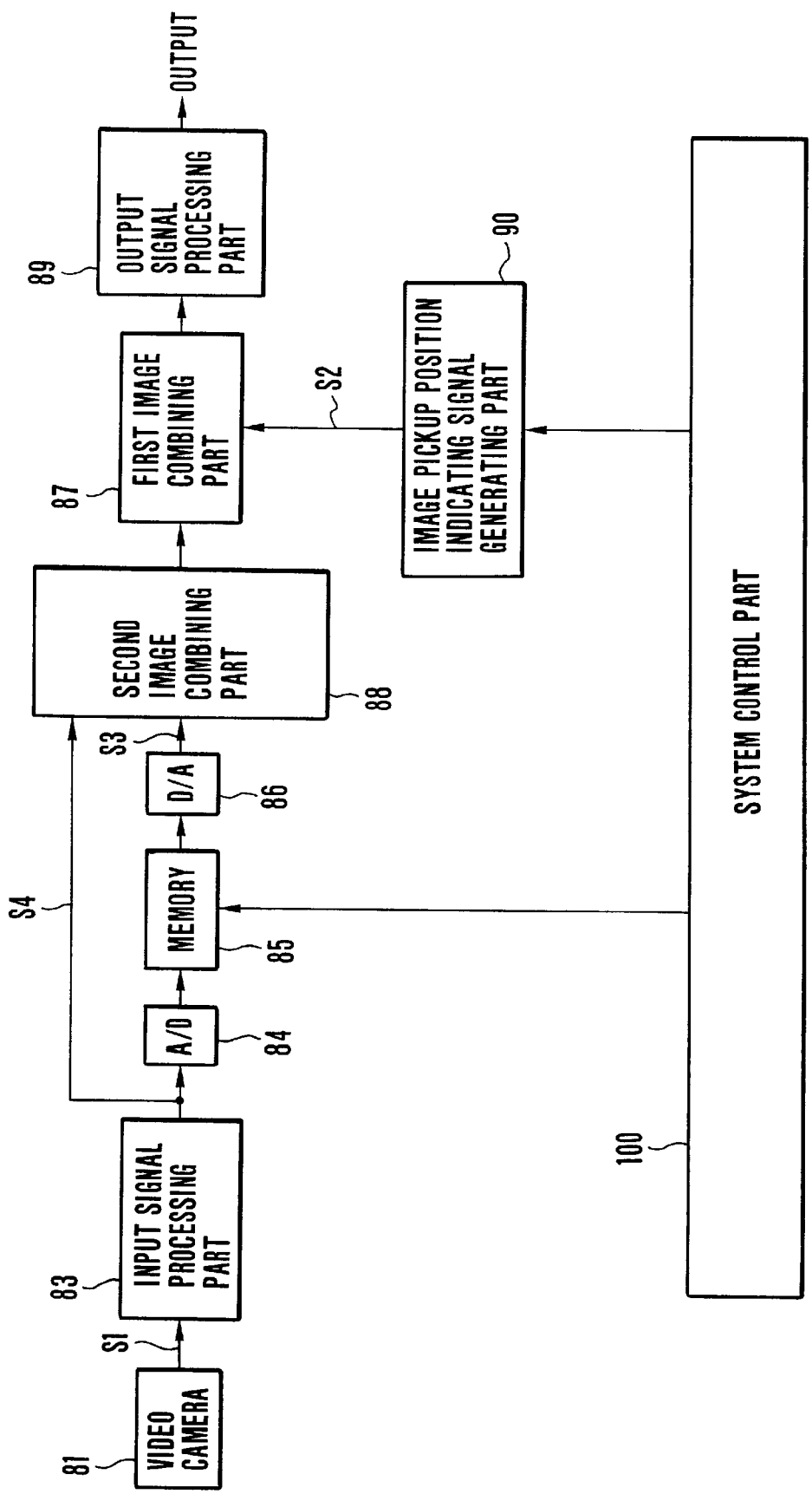

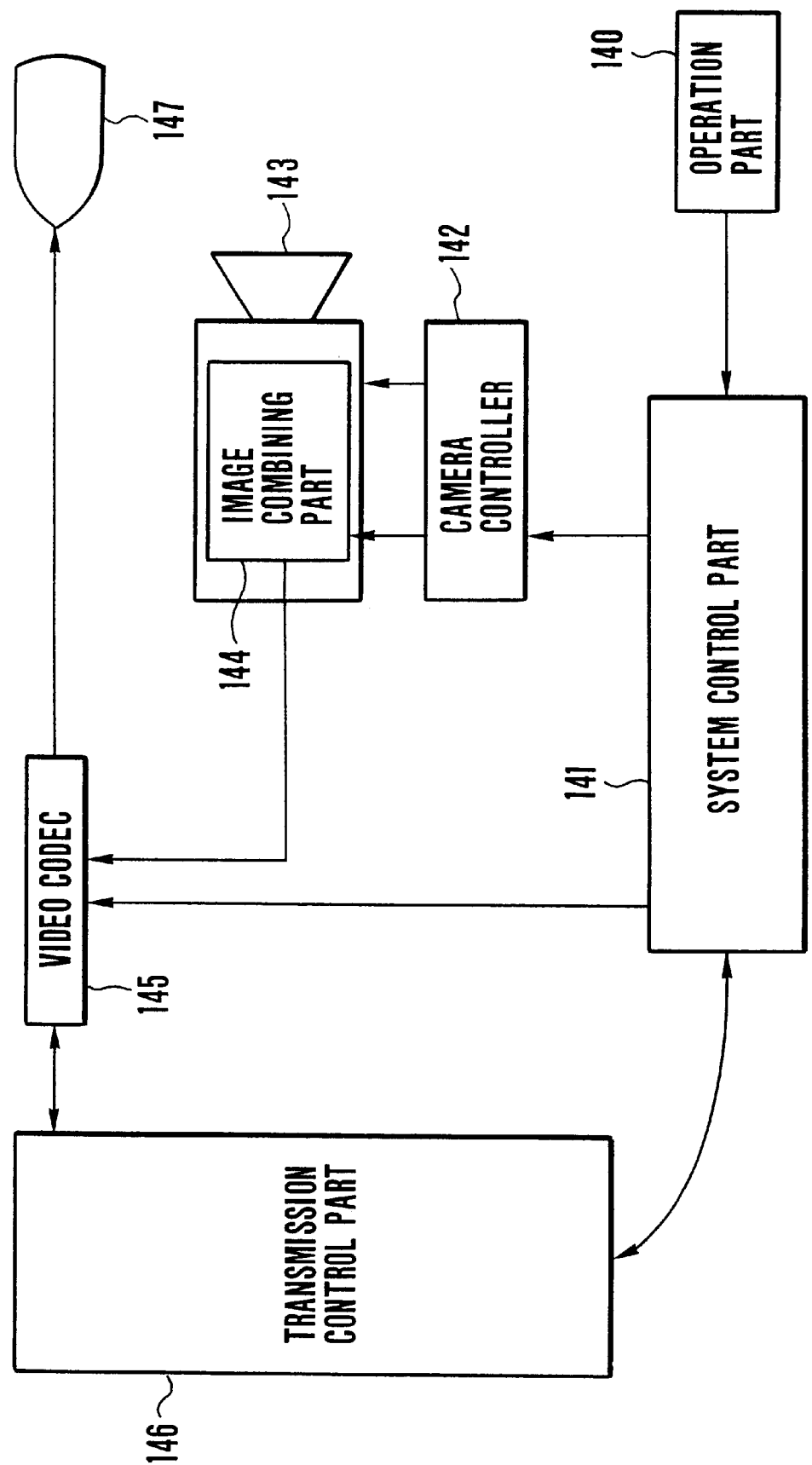

VIDEO CAMERA SYSTEM HAVING PANHEAD FOR USE IN VIDEO CONFERENCE OR THE LIKE

BACKGROUND OF THE INVENTION

1. Field of the Invention

This invention relates to a video camera system and more particularly to a video camera system which is capable of controlling a video camera having a panhead for use in, for example, a video conference.

2. Description of the Related Art

An apparatus which is arranged as shown in FIG. 1 has been known as a terminal unit for a video conference system. Referring to FIG. 1, an image signal from a video camera 72 is processed by an image processing part 75 and is outputted by a transmission part 76 to a communication line. An audio signal from a microphone or the like is encoded by an audio part 71 and is outputted by the transmission part 76 to the communication line. The image and audio signals outputted to the communication line are transmitted to another terminal unit which is arranged similarly to the unit shown in FIG. 1 and is set at a remote conference place.

Meanwhile, an image signal which is inputted to the transmission part 76 via the communication line from the terminal unit arranged at the remote conference place is processed by the image processing part 75. An image is displayed on a monitor 73 on the basis of the processed image signal. An audio signal which is inputted to the transmission part 76 via the communication line from the terminal unit arranged at the remote conference place is decoded by the audio part 71. The decoded audio signal is outputted to a speaker which is not shown.

The actions of the video camera 72 are arranged to be controlled by a camera controller 74 according to an operation performed on the operation part 78 or on an operation part of the terminal unit set at the remote conference place. The camera controller 74, the image processing part 75 and the transmission part 76 are controlled by a system control part 77.

However, according to the arrangement of the conventional video conference system described above, it has been impossible to know the exact location within the remote conference place of an image currently shown on the monitor 73. It has been also impossible to confirm a preset position at which the camera is to be set again when it is desired, for example, to see on the monitor 73 a particular participant present at the remote conference place.

SUMMARY OF THE INVENTION

It is an object of this invention to provide a video conference system which solves the above-stated problems of the prior art by enabling participants in a conference held between remotely separated places to know the directions of the video cameras and also to confirm the preset positions of the video cameras.

To attain this object, a video camera system arranged according to this invention as an embodiment thereof comprises detecting means for detecting the amount of a panning operation performed on a video camera, forming means for forming an electronic image indicating the direction of the video camera according to the amount of the panning operation detected by the detecting means, and combining means for combining the electronic image formed by the forming means with an image obtained from the video camera. This embodiment detects by the detecting means the amount of the panning operation performed on the video camera, forms by the forming means an electronic image indicating the direction in which the video camera is set, and combines by the combining means the electronic image formed by the forming means with an image obtained from the video camera.

A video camera system arranged as another embodiment of this invention comprises detecting means for detecting the amount of a panning operation performed on a video camera, storing means for storing the amount of the panning operation detected by the detecting means every time a presetting action is performed, forming means for forming an electronic image indicating the preset direction of the video camera according to the amount of the panning operation stored by the storing means, and combining means for combining the electronic image formed by the forming means with an image obtained from the video camera. That embodiment stores by the storing means the amount of the panning operation detected by the detecting means every time the presetting action is performed, forms an electronic image indicating the direction in which the video camera is set according to the amount of the panning operation stored by the storing means, and combines the electronic image formed by the forming means with an image obtained from the video camera.

It is another object of the invention to provide a video conference system which is arranged to permit confirmation of the direction in which a video camera is set even when the video camera is in a zoom-up state.

To attain that object, a video camera system arranged as an embodiment of this invention to detect the amount of a panning operation performed on the video camera and to form an electronic image which indicates the direction of the video camera on the basis of the amount of the panning operation detected comprises camera direction indicating picture forming means for forming, according to the amount of the panning operation, an electronic image indicating the direction in which the video camera is set image memory means for storing an image obtained with the video camera in a wide-angle position, and combining means for combining the image stored in the image memory means with the electronic image formed by the camera direction indicating picture forming means. In the embodiment, the video camera is arranged to be capable of always storing, in the image memory means, an electronic image showing a whole scene taken with the video camera set on a wide-angle side so that the image which indicates the direction of the video camera can be displayed in combination with the electronic image which shows the whole scene. Therefore, the direction in which the video camera is set can be clearly displayed even if an image being currently picked up by the video camera is in a zoom-up state.

These and other objects and features of this invention will become apparent from the following detailed description of embodiments thereof taken in connection with the accompanying drawings.

BRIEF DESCRIPTION OF THE DRAWINGS

FIG. 1 is a block diagram showing a terminal unit of the conventional video conference system.

FIG. 2 is a block diagram showing a terminal unit of a video conference system arranged according to this invention as a first embodiment thereof.

FIG. 10 is a block diagram showing the arrangement of a fifth embodiment of this invention.

FIG. 11 is a block diagram showing in part the arrangement of a sixth embodiment of this invention as applied to a video conference system.

DETAILED DESCRIPTION OF THE PREFERRED EMBODIMENTS

Figure 3A:
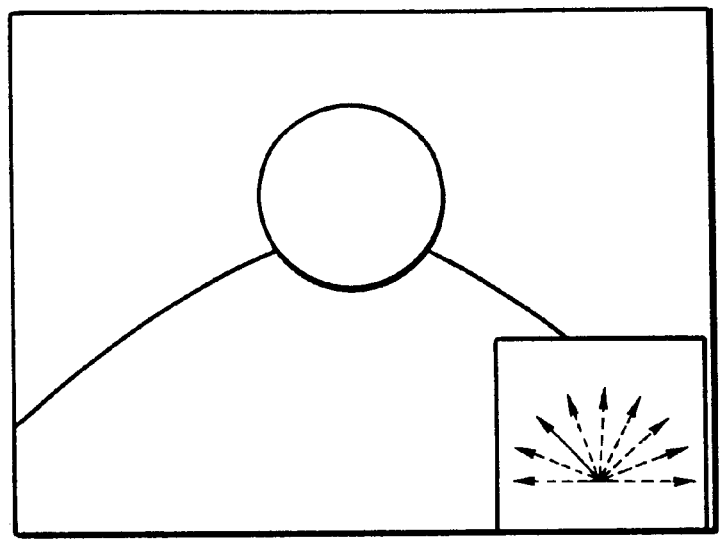
FIGS. 3(a) and 3(b) show examples of pictures displayed on the monitor of the first embodiment.

The following describes in detail embodiments of this invention with reference to the drawings:

EMBODIMENT I

FIG. 2 shows the terminal unit of a video conference system arranged as a first embodiment of this invention. Referring to FIG. 2, a video camera 2 is arranged to pick up images within conference room. A camera controller 4 is arranged to permit either a panning operation or a tilting operation on the video camera 2 in response to an operation performed either on an operation part 8 or on an operation part of a terminal unit located in a remote conference place. The maximum amount of the panning operation on the video camera 2 is 180 degrees.

A position detecting part 9 is arranged to detect the amount of the panning operation on the video camera 2. An image pickup position indicating signal generating part 10 is arranged to generate a predetermined electronic image which is, for example, an arrow mark, which indicates that the video camera 2 is swung to a degree of angle corresponding to the amount of the panning operation detected by the position detecting part 9. A memory 11 is arranged to store data for a background image. An image pickup position indicating memory 12 is provided for superimposing an electronic image obtained from the image pickup position indicating signal generating part 10 on the background image data read from the memory 11. An image processing part 5 is arranged to process the image signal coming from the video camera 2, to read out an image signal from the image pickup position indicating memory 12 in synchronism with the image signal coming from the video camera 2, and to supply the image signal processed and the image signal read out to a transmission part 6. The image processing part 5 is further arranged to process an image signal coming from the transmission part 6 and to supply the image signal thus processed to a monitor 3. The monitor 3 is arranged to show a picture on the basis of the image signal received from the image processing part 5.

An audio part 1 is arranged to encode an audio signal coming from a microphone 15 or the like. The audio part 1 is also arranged to decode an audio signal coming from the transmission part 6 and to send the decoded audio signal to a speaker 16.

The transmission part 6 is arranged to supply the image signal from the image processing part 5 and the audio signal from the audio part 1 to a communication line for transmission to a terminal unit disposed at the remote conference place. The transmission part 6 is arranged further to receive an image signal via the transmission line from the terminal unit disposed at the remote conference place and to supply it to the image processing part 5 and also to receive an audio signal which is inputted via the communication line and to supply it to the audio part 1.

The operation of the first embodiment which is arranged in the above-stated manner will be described below:

When either the operation part 8 or an operation part of a terminal unit disposed at a remote conference place is operated, the video camera 2 is panned by the camera controller 4. The position detecting part 9 then detects the amount of the panning operation on the video camera 2. Data representing the panning amount detected is supplied via a system control part 7 to the image pickup position indicating signal generating part 10. Upon receipt of the panning amount data, the image pickup position indicating signal generating part 10 supplies to the image pickup position indicating memory 12 an electronic image, such as an arrow mark, according to the detected panning amount in such a way, for example, as to have the arrow mark turned on the image plane of the monitor of the terminal unit disposed at the remote conference place. At the image pickup position indicating memory 12, the data for the arrow mark is superimposed on the background image data obtained from the memory 11. The arrow data thus stored in the image pickup position indicating memory 12 is read out by the image processing part 5 in synchronism with the image data coming from the video camera 2. Then, the arrow data and the image data are supplied from the image processing part 5 to the transmission part 6. The transmission part 6 outputs the image data and the arrow data to the communication line for transmission to the terminal unit disposed at the remote conference place.

Figure 3B:
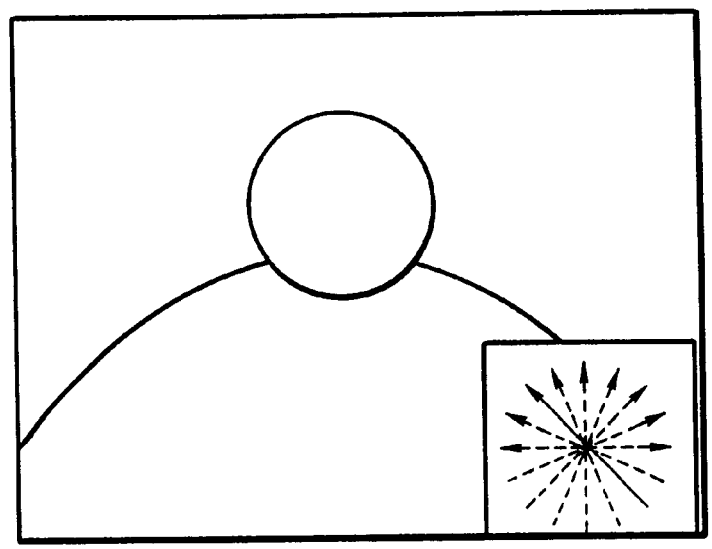

At the terminal unit of the remote conference place, the image picked up by the video camera 2 appears on a main image plane and the arrow mark on an auxiliary image plane of the monitor of the terminal unit disposed at the remote conference place. These image planes of the monitor are as shown, by way of example, in FIGS. 3(a) or 3(b). The arrow (mark) is arranged to turn around its end in the case of FIG. 3(a) and to turn around its middle part in the case of FIG. 3(b).

EMBODIMENT II

Figure 4:
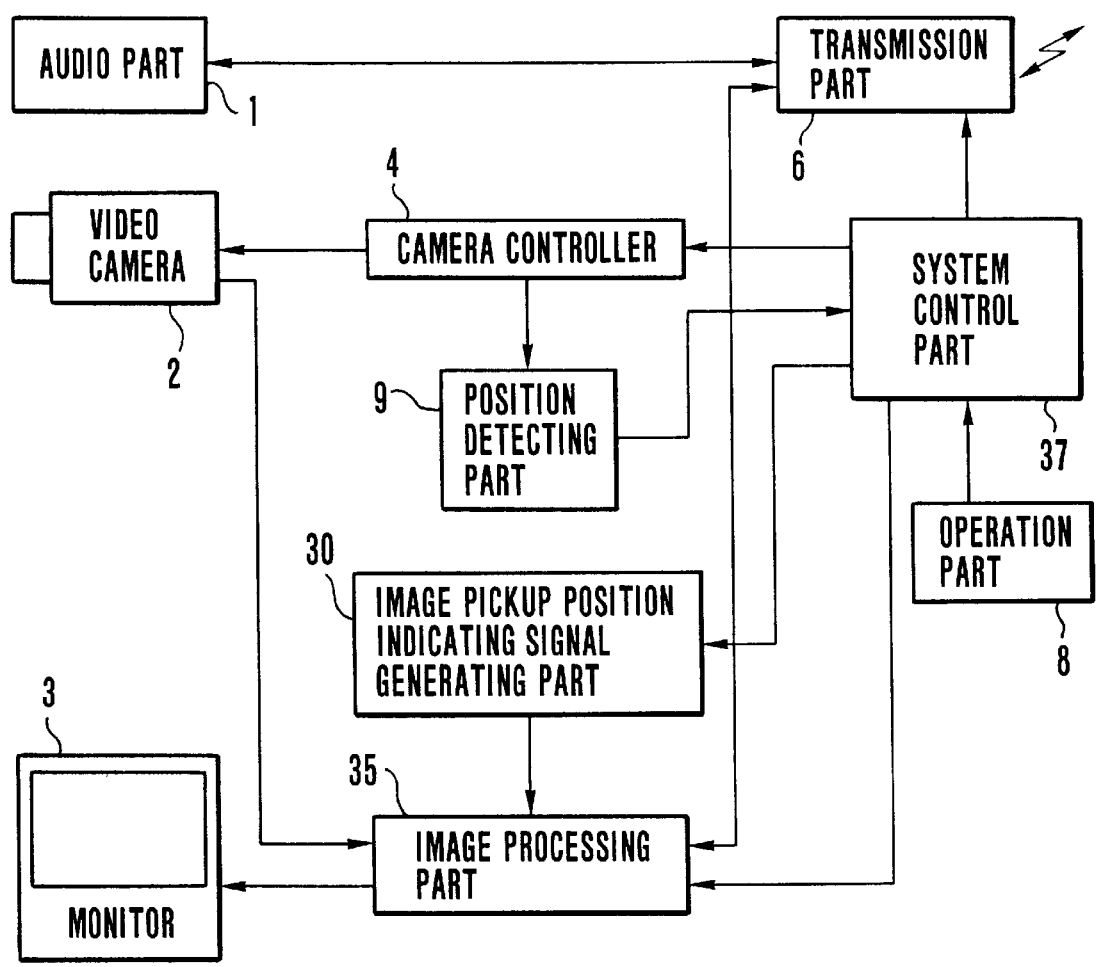
FIG. 4 is a block diagram showing a terminal unit of a video conference system arranged according to this invention as a second embodiment thereof.

FIG. 4 shows a terminal unit of a video conference system arranged as a second embodiment of this invention. In FIG. 4, elements 1 to 4, 6, 8 and 9 are identical with the corresponding elements shown in FIG. 2. Referring to FIG. 4, an image pickup position indicating signal generating part 30 is arranged to generate the data of the image of a segment array, and to change to a given color the color of a cursor (segment) corresponding to the amount of a panning operation of the video camera 2 detected by the position detecting part 9. An image processing part 35 is arranged to superimpose the segment array image generated by the image pickup position indicating signal generating part 30 on an image obtained from the video camera 2. A system control part 37 controls the camera controller 4, the transmission part 6, the image pickup position indicating signal generating part 30 and the image processing part 35.

The second embodiment which is arranged in the above-stated manner operates as follows:

When the operation part 8 or an operation part of a terminal unit disposed at a remote conference place is operated, the video camera 2 is panned by the camera controller 4. the amount of the panning operation on the video camera 2 is detected by the position detecting part 9. Data representing the panning amount thus detected is outputted to the image pickup position indicating signal generating part 30 via the system control part 7. At the image pickup position indicating signal generating part 30, the color of a segment corresponding to the panning amount is changed to a given color to be shown on the image plane of the monitor of the terminal unit disposed at the remote conference place. The segment array image from the image pickup position indicating signal generating part 30 is superimposed on an image coming from the video camera 2 by the image processing part 35. The superimposed image is supplied to the transmission part 6 to be outputted from the transmission part 6 to a communication line.

Figure 5:
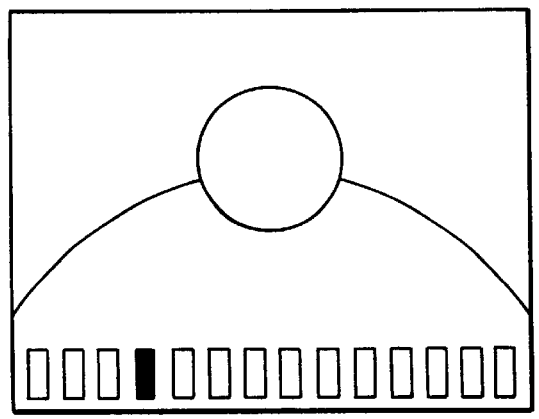
FIG. 5 shows by way of example a picture displayed on the monitor of the second embodiment.

As a result, to the monitor of the terminal unit disposed at a remote conference place is inputted an image with the segment array image superimposed thereon. FIG. 5 shows by way of example a composite picture thus obtained. In the case of FIG. 5, the color of the fourth segment as counted from the left is changed.

EMBODIMENT III

Figure 6:
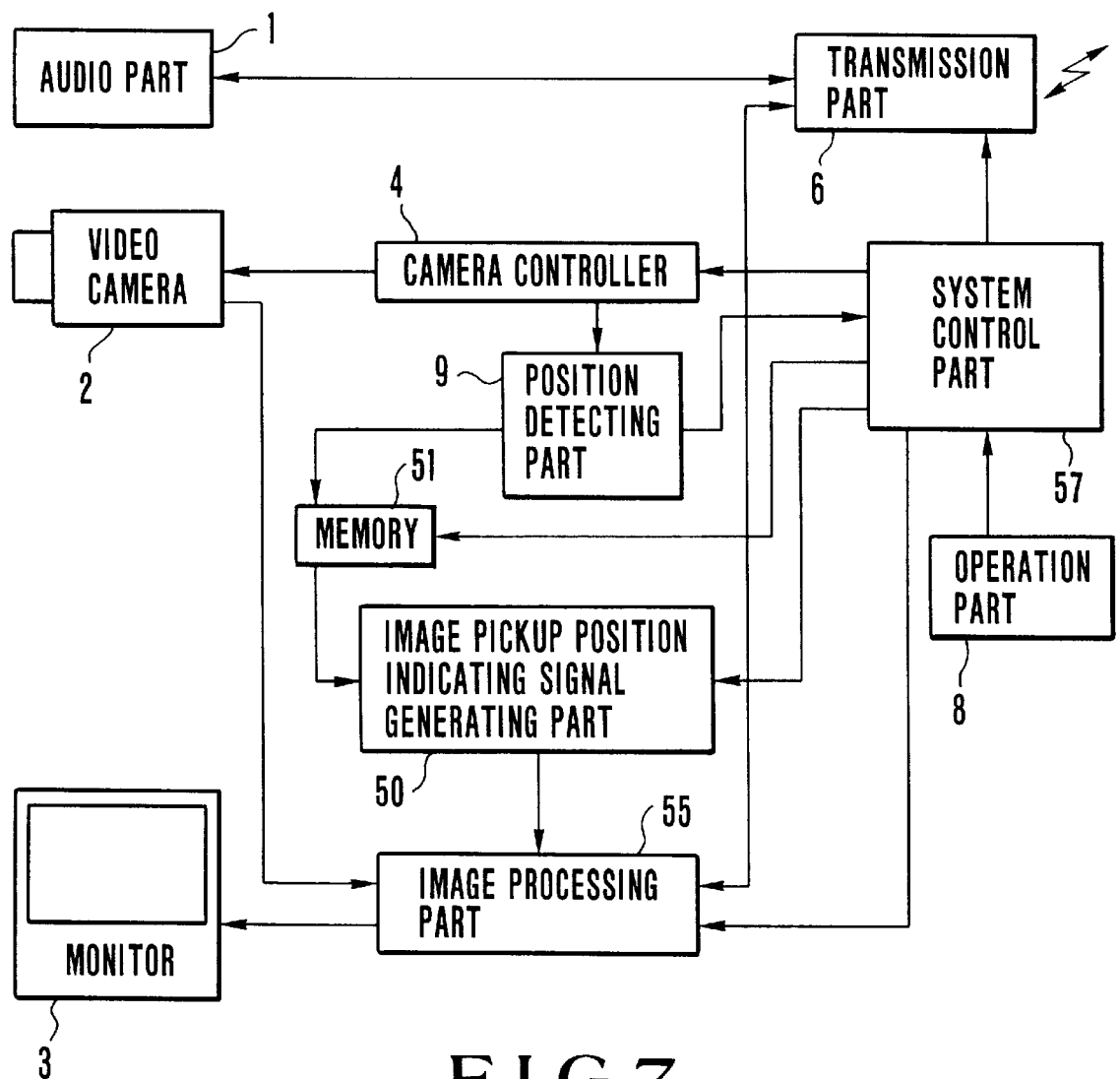
FIG. 6 is a block diagram showing a terminal unit of a video conference system arranged according to this invention as a third embodiment thereof.

FIG. 6 shows a terminal unit of a video conference system arranged as a third embodiment of this invention. In FIG. 6, component elements 1 to 4, 6, 8 and 9 are identical with the corresponding elements shown in FIG. 2. In the third embodiment, a memory 51 is arranged to store the amount of a panning operation of the video camera 2 detected by the position detecting part 9 when the video camera is preset by the operation part of the terminal unit disposed at the remote conference place. An image pickup position indicating signal generating part 50 is arranged not only to output a segment array image but also to change, to a given color, the color of a segment corresponding to a direction obtained on the basis of a preset data read out from the memory 51. An image processing part 55 is arranged to superimpose the segment array image from the image pickup position indicating signal generating part 50 on an image coming from the video camera 2. A system control part 57 is arranged to control the camera controller 4, the transmission part 6, the image pickup position indicating signal generating part 50, the memory 51 and the image processing part 55.

The third embodiment operates as follows: When a presetting operation is performed on the operation part of the terminal unit disposed at the remote conference place, the video camera 2 is actually panned every time the presetting operation is performed. The memory 51 then stores the amount of the panning operation of the video camera 2 detected by the position detecting part 9 according to the panning action. According to this arrangement, the video camera 2 can be preset in a given position by just panning the video camera 2 in the desired direction of image pickup. It is also possible to arrange the embodiment to have a presetting position inputted directly from the operation part. The system control part 57 then reads the stored amount of the panning operation from the memory 51. Then, the image pickup position indicating signal generating part 50 changes the color of a segment corresponding to the amount of the panning operation thus read out to a given color. A segment array image thus obtained from the image pickup position indicating signal generating part 50 is supplied to the image processing part 55 to be superimposed on an image coming from the video camera 2. The superimposed signal thus obtained is supplied to the transmission part 6 to be outputted from there to the communication line.

Figure 7:
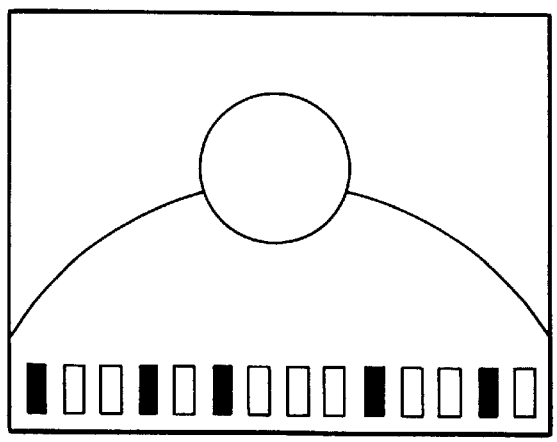
FIG. 7 shows by way of example a picture displayed on the monitor of the third embodiment.

As a result, the monitor of the terminal unit disposed at the remote conference place displays the image from the video camera 2 and the segment array image in which, for example, the color of the first, fourth, sixth, 10th and 13th segments, as counted from the left, is changed as shown in FIG. 7.

According to the arrangement of the embodiments described in the foregoing, the video conference system enables the participants in a conference not only to know the direction in which the video camera is set within each remote conference place but also to confirm the preset position of the video camera.

An arrangement to serially light up (or change the color of) the segments of preset parts in the sequence of presetting facilitates detection of positions to which the video camera is to be moved or panned. Further, an arrangement to flicker a position to which the video camera is to be moved (panned) next also facilitates detection of the next panning position.

Video camera systems which are improved further in accordance with this invention are described below:

EMBODIMENT IV

Figure 8:
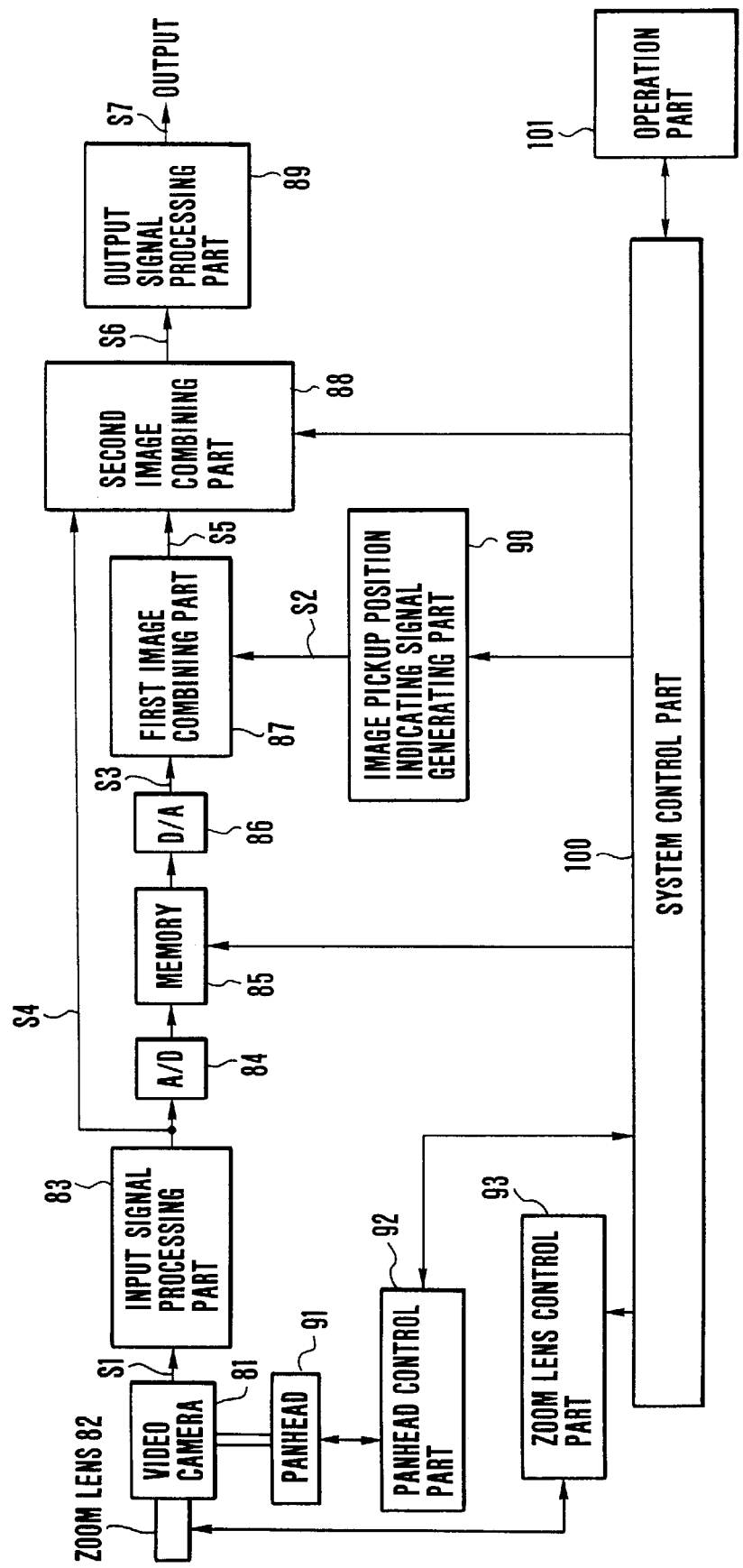
FIG. 8 is a block diagram showing the arrangement of the essential parts of a video camera system arranged as a fourth embodiment of this invention.
Figure 9A:
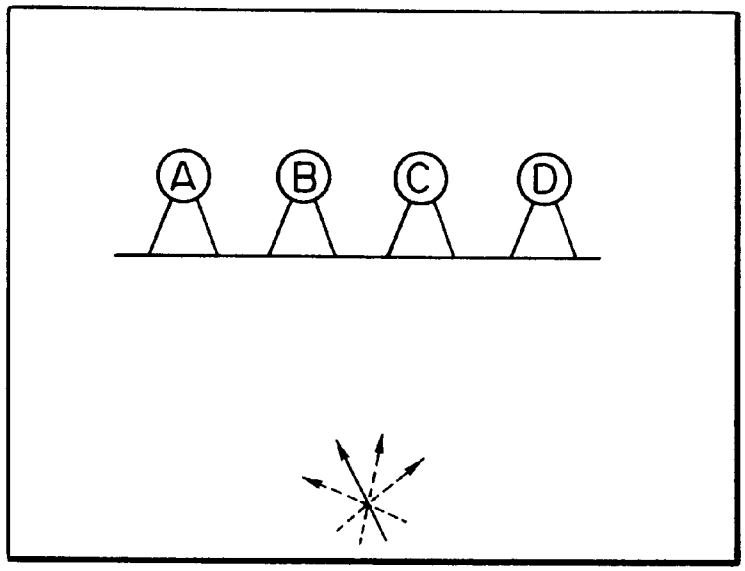
FIGS. 9(a) and 9(b) show examples of displays made by the fourth embodiment shown in FIG. 8.
Figure 9B:
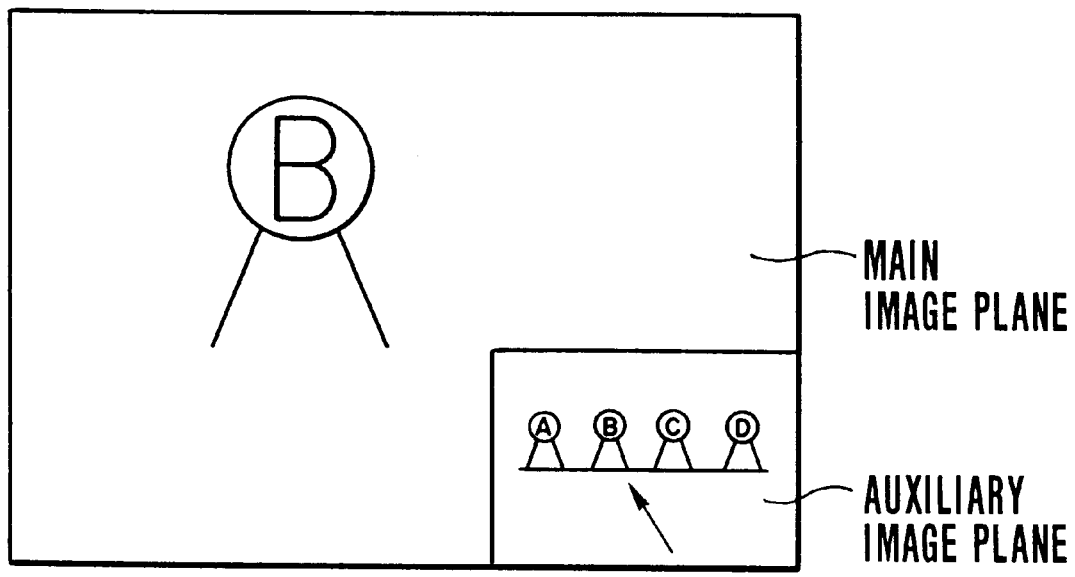

FIGS. 8, 9(a) and 9(b) show a video camera system which is arranged as a fourth embodiment of this invention to permit confirmation of the direction in which the video camera is set even when the video camera is in a zoom-up state. Referring to FIG. 8, a zoom lens 82 is mounted on the video camera 81. An input signal processing part 83 is arranged to process an electrical signal received from the video camera 81. The embodiment includes an A/D (analog-to-digital) converter 84, an image memory 85, a D/A (digital-to-analog) converter 86, a first image combining part 87, a second image combining part 88, and an output signal processing part 89. A panhead 91 has the video camera 81 mounted thereon. A panhead control part 92 is arranged to control the panhead 91. A zoom lens control part 93 is arranged to control the zoom lens 82. A system control part 100 is arranged to control the whole system. Reference numeral 101 denotes an operation part. The video camera system of the fourth embodiment of this invention which is arranged as described above operates as follows:

As shown in FIG. 8, the video camera 81 is mounted on the panhead 91 and is arranged to be panned through the panhead control part 92 under the control of the system control part 100. The panhead control part 92 is arranged either to control the absolute panning position of the panhead 91 or to first reset position information by using a limit switch and then to control a relative position by using a stepping motor. The control action of the panhead control part 92 enables the system control part 100 to know the current position of the panhead 91, i.e., the direction in which the video camera 81 is set. The zooming action of the zoom lens 82 which is mounted on the video camera 91 is controlled by the zoom lens control part 93 under the control of the system control part 100.

An image signal S1 for an image picked up by the video camera 81 is inputted to the input signal processing part 83 to be subjected to a given signal processing action. The image signal S1 thus processed is supplied to the A/D converter 84 to be digitized there. The image memory 85 then stores digital image signal thus obtained.

The image signal stored in the image memory 85 is read out at a given timing. The image signal read out is converted into an analog signal by the D/A converter 86. The reading process can be carried out in either of two different manners which are as follows. For having the stored image signal displayed in a full size, a full picture amount of the image signal is sent to the D/A converter 86 by a normal access process. In a case where an image combining process is to be carried out at the second image combining part 88 for the purpose of making a combined display consisting of a main image plane and an auxiliary image plane, as will be described later, an image for the auxiliary image plane display is sent from the image memory 85 to the D/A converter 86.

At the same time, the system control part 100 sends information on the direction in which the video camera 81 is set to the image pickup position indicating signal generating part 90. The system control part 100 thus causes the image pickup position indicating signal generating part 90 to generate a character signal as angular information or as an arrow signal for displaying the direction of the video camera 81. The signal generating action is performed by using a character generator or by using a bit map memory for generation of a pattern.

A display signal S2 which is thus generated by the image pickup position indicating signal generating part 90 is arranged to be variable in size for a full size display or for a reduced size display like at the time of having access to the image memory 85. The display signal S2 from the image pickup position indicating signal generating part 90 is supplied to the first image combining part 87 to be combined with an image signal S3 which comes from the D/A converter 86. These signals can be combined in various manners, such as a simple method of switching or a method of adding these signals together.

The image signal S3 which is read out from the image memory 85 and D/A converted and the display signal S2 which is generated by the image pickup position indicating signal generating part 90 are thus combined with each other as mentioned above. A composite signal S5 thus obtained is inputted to the second signal combining part 88. The second image combining part 88 is arranged to operate in any of different methods. In one method, the signal S5 outputted from the first image combining part 87 is allowed to pass through there. In another, the image signal S4 outputted from the input signal processing part 83 is allowed to pass through there. In a further method, the two signals S4 and S5 are combined either to be displayed on main and auxiliary image planes within one and the same picture or to be displayed in the form of a two-window display.

A signal S6 which is thus obtained from the second image combining part 88 is supplied to the output signal processing part 89 to be processed in a given manner. As a result, the output signal processing part 89 outputs the signal as an output image signal S7.

FIG. 9(a) shows a case where the panhead 91 is set in its middle position, an image picked up with the zoom lens 82 set on a wide-angle position is taken in the image memory 85, and this image and a signal which is generated by the image pickup position indicating signal generating part 90 and which indicates the current image pickup position are displayed in a combined state on a monitor.

FIG. 9(b) shows another case where an image which is picked up under the same condition as in the case of FIG. 9(a) is first stored in the image memory 85, after that, this image is displayed on an auxiliary image plane together with the display signal obtained from the image pickup position indicating signal generating part 90, and, at the same time, an image signal from the video camera 81 is displayed on a main image plane. In this case, the same advantageous effect is attainable by arranging the first and second image combining parts 87 and 88 to combine the signals in a digitized state and, after that, to convert them into analog signals by a D/A converter.

EMBODIMENT V

FIG. 10 shows a video camera system arranged according to this invention as a fifth embodiment thereof. In the case of the fifth embodiment, the sequence of the image combining processes to be performed by first and second image combining parts is changed from the sequence of the fourth embodiment. The component elements of the fifth embodiment corresponding to those of the fourth embodiment are indicated by the same reference numerals.

Referring to FIG. 10, an image signal S1 from the video camera 81 is A/D converted by the A/D converter 84 and is stored in the image memory 85. The signal thus stored is read out from the image memory 85 and is D/A converted by the D/A converter 86.

The operation of the fifth embodiment up to this point is the same as the fourth embodiment shown in FIG. 8. An image signal S3 outputted from the D/A converter 86 is supplied to the second image combining part 88. At the second image combining part 88, an image signal S4 obtained by processing the image signal S1 from the video camera 81 through the input processing part 83 is image-combined with the image signal S3. After that, a resultant signal thus obtained is supplied to the first image combining part 87. Meanwhile, a display signal S2 generated by the image pickup position indicating signal generating part 90 is supplied also to the first image combining part 87. The first image combining part 87 combines these signals. A signal thus obtained through the first image combining part 87 is outputted through the output signal processing part 89.

As described above, each of the fourth and fifth embodiments comprises an image memory which is arranged to take in an image signal representing an image picked up by setting the lens of the video camera on its wide-angle side, camera direction indicating image plane forming means for forming an electronic image signal indicating the direction in which the video camera is set, and combining means for combining these signals. These embodiments permit easy confirmation of the direction in which the video camera is currently directed while keeping the image of an overall scene in sight even when the video camera is being panned in a zoom-up state.

Next, a video conference system arranged as a sixth embodiment of this invention will be described below:

EMBODIMENT VI

FIG. 11 shows in part a video conference system to which this invention is applied as the sixth embodiment thereof. Referring to FIG. 11, a camera controller 142, a camera 143 and an image combining part 144 are component parts of a panhead-integrated camera according to the sixth embodiment.

With the sixth embodiment arranged as shown in FIG. 11, when the operator operates an operation part 140 to enter a command for a panning or tilting action on the camera disposed on the host side of the conference, the command for the action is first transmitted to the system controller 141. Upon receipt of the command, the system controller 141 instructs the camera controller 142 to perform the camera action. In response to this instruction, the camera controller 142 causes the panhead attached to the camera 143 to carry out the panning or tilting action. At the same time, the camera controller 142 sends a superimposition request to the image combining part 144.

The image combining part 144 which is disposed within the camera 143 combines a video signal which is currently outputted from the camera 143 with a signal for a vertical arrow indicating the direction of a tilting action of the panhead as well as for a horizontal arrow. A composite signal which is thus formed is then outputted as a new video signal from the camera 143.

The video signal output of the camera 143 is supplied to a video codec (coder-decoder) 145 to be encoded there. The video codec 145 is connected to a transmission control part 146. An encoded image (video) signal thus obtained is sent out to a transmission line. Meanwhile, an image signal which is inputted via the transmission line to the transmission control part 146 is decoded by the video codec 145. The decoded image signal thus obtained is sent to a monitor 147 to be converted into an image. Further, the command for the camera action which is inputted via the transmission line is supplied from the transmission control part 146 to the system controller 141. Then, in response to the command, the action of the camera 143 is carried out also in the same manner as described above.

Figure 12A:
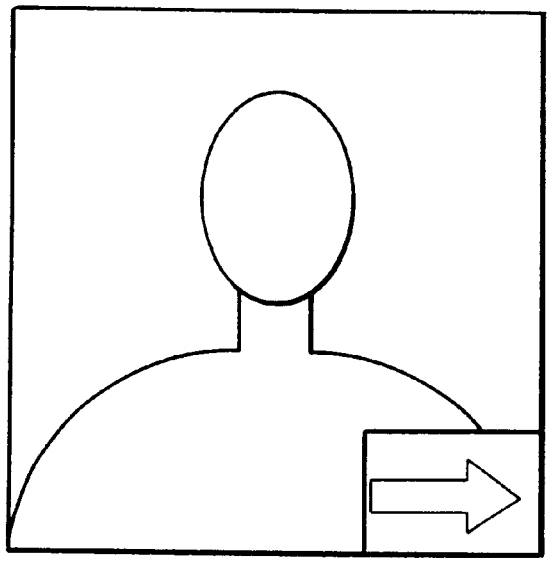
FIGS. 12(a) and 12(b) show examples of pictures obtained with the video output of the video camera of the sixth embodiment inputted to a monitor.
Figure 12B:
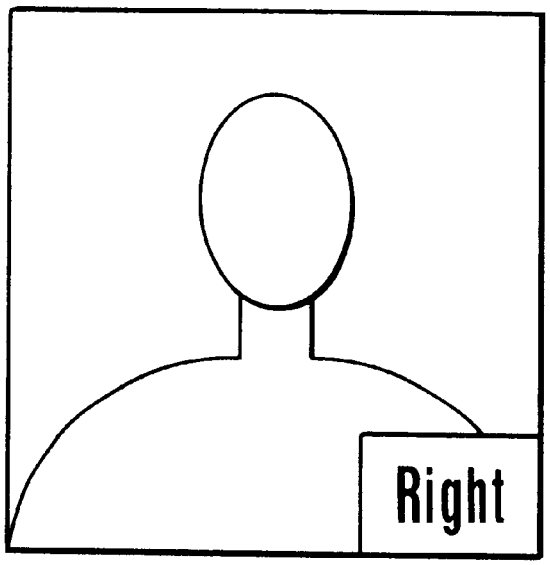

In a case where the camera 143 is caused to act either by the partner of communication or by the operator, the vertical and horizontal arrows which indicate the directions of the panning and tilting actions being performed on the camera 143 are caused to appear, as shown in FIG. 12(a), within a picture currently shown on the monitor by which the video signal is converted into an image. Further, the sixth embodiment may be arranged to make a character display in a manner as shown in FIG. 12(b).

Therefore, the embodiment is arranged to make a picture display as shown in FIG. 9(b) when the facing direction of the camera is unvarying or to make a picture display as shown in FIG. 12(a) when the camera is moving. This arrangement enables the embodiment to show the position of any specific person within a whole scene while the camera is directed to the specific person and also to show the moving direction of the camera when the camera is being moved. Further an arrangement to display a moving direction indicating arrow in a picture as shown in FIG. 9(b) enables the embodiment to show the moving direction of the camera within the whole scene.

Figure 13:
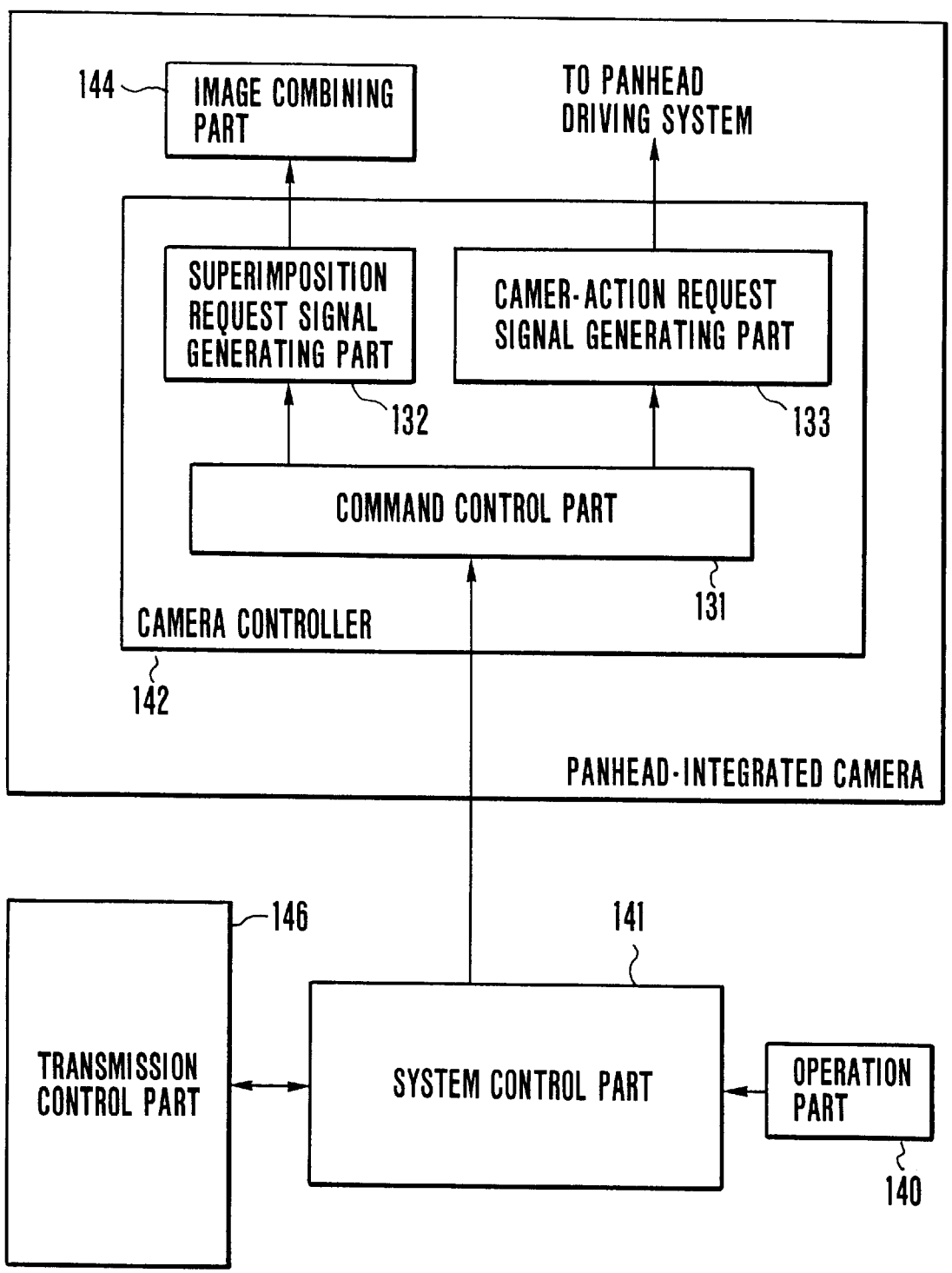
FIG. 13 is a block diagram showing in part the arrangement of a camera controller.

FIG. 13 shows the arrangement of a part of the above-stated camera controller 142 of this embodiment. Further, in FIG. 13, the parts which are the same as or corresponding to the parts shown in FIG. 11 are indicated by the same reference numerals and the details of them are omitted from the following description.

An output of the system controller 141 is connected to a command control part 131 disposed within the camera controller 142. The command control part 131 includes therein a timer counter for time-controlling the actions of two request signal generating parts 132 and 133 and also a command selector. The timer counter and the command selector are not shown. The output of the command control part 131 is supplied to the superimposition request signal generating part 132 and also to the camera-action request signal generating part 133.

The output of the superimposition request signal generating part 132 is supplied to the image combining part 144 disposed within the camera 143. The output of the camera-action request signal generating part 133 is supplied to a panhead driving system of the camera which is not shown.

Figure 14:
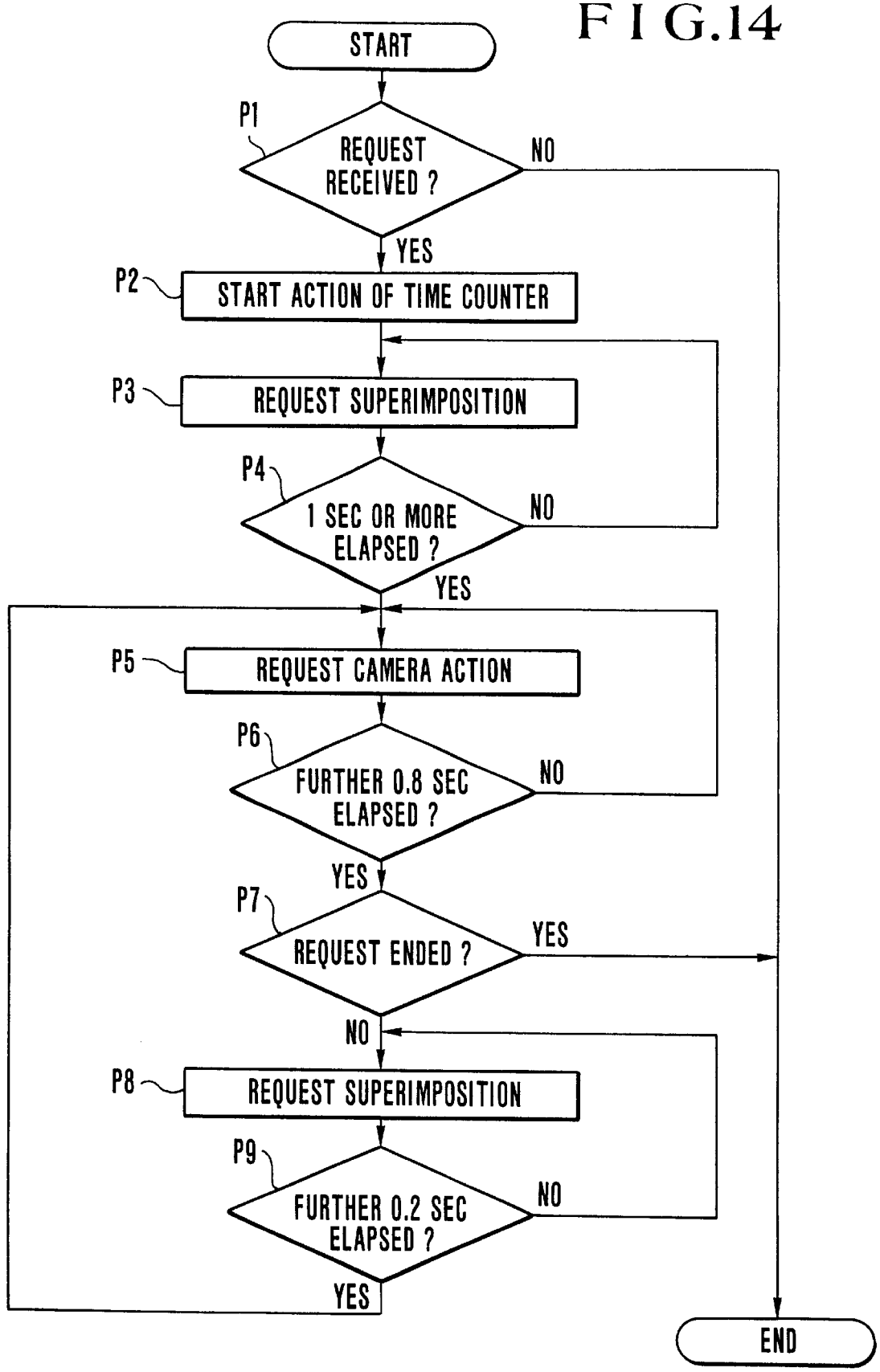
FIG. 14 is a flow chart showing by way of example a superimposition requesting operation performed by the camera controller.

The following describes the operation of the above-stated camera controller 141 with reference to FIG. 14, which is a flow chart showing the superimposition requesting operation of the camera controller 142 to be performed when the system controller 141 is operated for changing the direction of the camera 143:

At a step P1, at the beginning of the flow of the superimposition requesting operation of the camera controller 142, a check is made to find if a request for a camera action has been received by the command control part 131 from the system controller 141. If so, the flow of operation proceeds to a step P2. At the step P2, a timer counter which is provided for change-over of time of a request signal to be issued is caused to start its action by the command control part 131. At a step P3, following the step P2, the superimposition request signal generating part 132 is caused to operate for a period of one second. At a step P4, the image combining part 144 is caused to operate.

At a step P5, when one second is counted by the timer counter which is disposed within the command control part 131, the command control part 131 causes the command selector to render the camera action request signal generating part 133 operative. At a step P6, a camera action request signal is caused to be outputted for a next period of 0.8 second to the panhead driving system.

At a step P7, a check is made for the end of the camera action request from the system controller 141. If the request is found not to have been terminated, the flow comes to a step P8. At the step P8, the command selector is caused to render the superimposition request signal generating part 132 operative. At a step P9, the image combining part 144 is caused to act for a period of 0.2 second following the step P8. After the lapse of the period of 0.2 second, the flow comes back to the step P5.

At the step P5, again the command selector is caused to render the camera action request signal generating part 133 operative. At the step P6, the panhead driving system is caused to output the camera action request signal for a period of 0.8 second. At the step P7, if the camera action request signal is found not to have come to an end as yet, the flow comes to the step P8. At the step P8, again, the command selector is caused to render the superimposition request signal generating part 132 operative. At the next step P9, the image combining part 144 is caused to act for a further period of 0.2 second.

In other words, the camera controller 142 is arranged as follows: In a case where the camera action request signal from the system controller 141 continues more than 1.0 second, the camera controller 142 issues a request for superimposition for the initial period of 1.0 second. After that, the camera controller 142 issues the camera action request to the panhead driving system for the period of 0.8 second and the superimposition request to the image combining part 144 for the period of 0.2 second and alternately repeats these requests until the end of the request signal input from the system controller 141.

Figure 15:
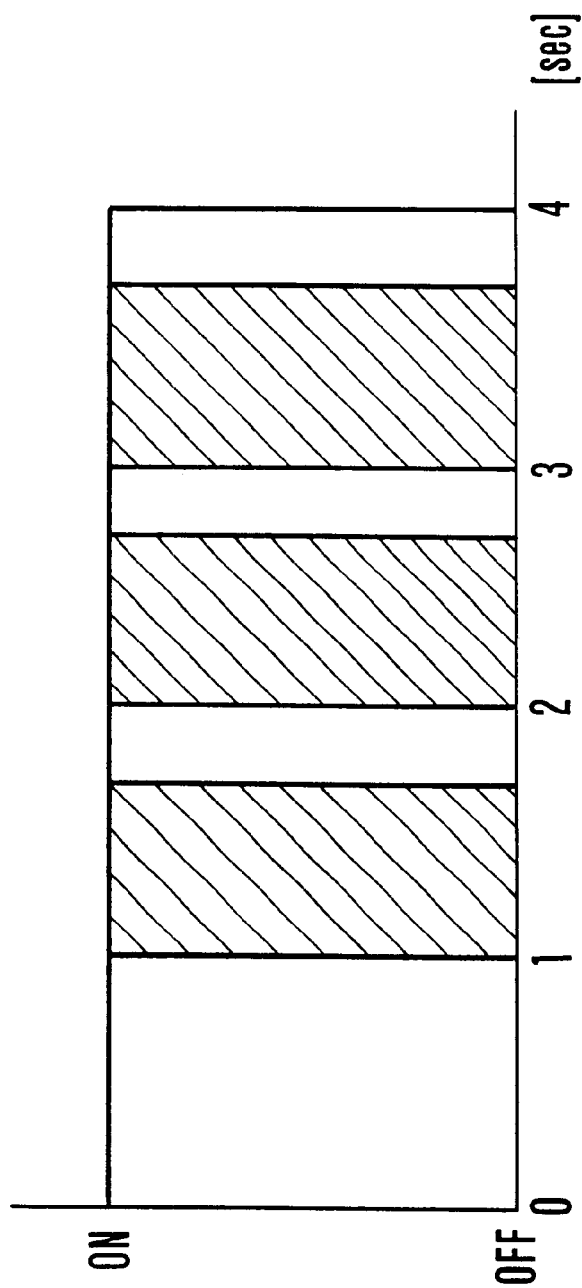
FIG. 15 is a time chart showing by way of example commands issued from the camera controller.

FIG. 15 is a time chart showing the camera action request signal and the superimposition request signal issued by the camera controller 142 as in relation to each other. As shown in FIG. 15, the superimposition request signal is issued for a period of one second after receipt of the camera action request signal from the system controller 141. After the period of one second, the request for superimposition and the camera action request are alternately repeated until the camera action request from the system controller 141 ceases to come.

Figure 16:
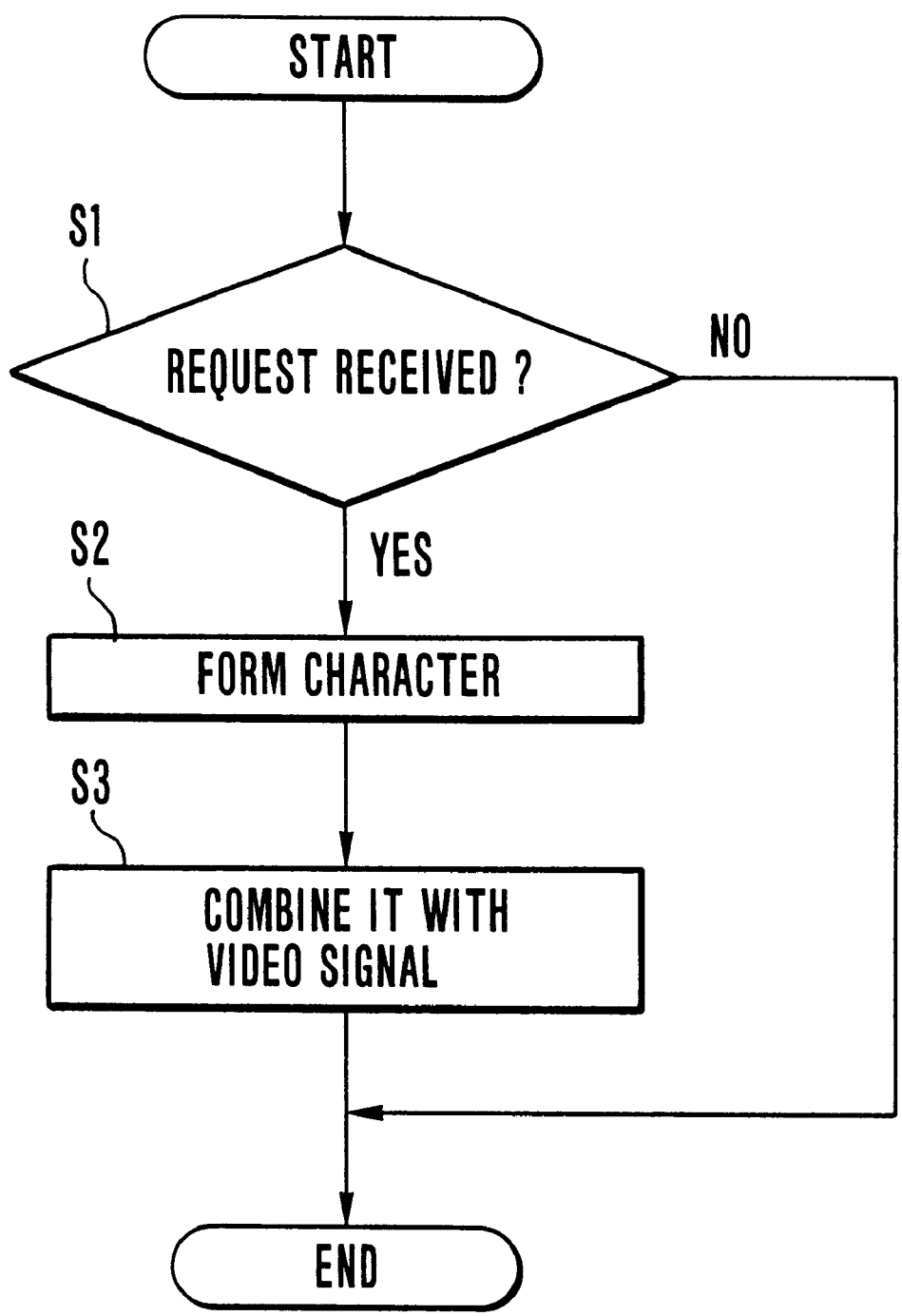
FIG. 16 is a flow chart showing the action of an image combining part.

Next, the combining operation of the image combining part 144 is described with reference to FIG. 16. FIG. 16 is a flow chart showing the flow of the combining operation of the image combining part 144. At a step S1, the image combining part 144 makes a check to find if a request for superimposition is received from the camera controller 142. If so, the flow comes to a step S2. At the step S2, an arrow mark is formed as a character which indicates the moving direction of the camera for the purpose of combining it with the video signal. At a step S3, the arrow mark is combined with the video signal.

The image combining part 144 receives the superimposition request from the camera controller 141 continuously for an initial period of one second and, after that period, intermittently receives the request. In a case where the video output from the camera 143 is displayed on the monitor, the arrow mark thus can be shown along with the output image on the monitor in a stationary state during the initial period of one second before the camera begins to move and, after that, in an intermittent manner.

While the embodiment has been described as arranged to display the moving direction of the camera by means of an arrow mark when the camera is moving, the invention is of course not limited to this arrangement. For example, in accordance with the invention, the camera movement can be likewise indicated by some characters or letters, instead of the arrow, as shown in FIG. 12(b).

As described above, this embodiment is arranged such that, within the panhead-integrated camera, the image combining part is arranged to have some character information superimposed on the signal of an image picked up by the image sensor, and the camera controller is arranged to control the image combining part and the movement of the video camera. The image combining part is operated by a control signal which comes from the camera controller to combine a video signal for an image picked up by the video camera with a signal which is formed for making a display corresponding to the movement of the video camera. A composite signal thus obtained is outputted as a new video signal. The invented arrangement thus gives, at a low cost, a function of obtaining a video signal on which a signal for displaying the moving direction of the video camera is superimposed.

Where the video camera system of this embodiment applied to a video conference system, when a camera on the host side of the conference moves, a display signal which indicates the moving direction of the camera is combined with a video signal obtained by the camera on the host side. The display signal is transmitted along with the video signal to a video camera system disposed on the side of participants who are in a remote place. The invented arrangement enables the user of the system in the remote place to see the moving direction of the camera disposed on the host side. The movement of the camera on the host side thus can be clearly known even when the background of the conference place on the host side is uniform.

What is claimed is:

1. A video camera system comprising:
   a) a video camera for picking up an image of an object;
   b) a moving mechanism for changing an image pickup direction of said video camera;
   c) detecting means for detecting the absolute image pickup direction;
   d) image forming means for forming image data indicating the absolute image pickup direction together with a movable range of the image pickup direction during the operation of said video camera detected by the detecting means; and
   e) combining means for combining the image data indicating the absolute image pickup direction together with a movable range of the image pickup direction with data of the image of the object picked up by said video camera.

2. A system according to claim 1, wherein the image pickup direction of said video camera is a direction which is variable by panning.

3. A camera system comprising:
   a) a video camera for picking up an image of an object;
   b) a moving mechanism for changing an image pickup direction of said video camera;
   c) detecting means for detecting the absolute image pickup direction during operation of said video camera;
   d) a memory for storing a value of the absolute image pickup direction detected by said detecting means;
   e) image forming means for forming image data indicating the absolute image pickup direction together with a movable range of the image pickup direction during the operation of said video camera detected by the detecting means; and
   f) combining means for combining the image data indicating the absolute image pickup direction together with a movable range of the image pickup direction and formed by said image forming means with data of the image of the object picked up by said video camera.

4. A system according to claim 3, wherein said memory is arranged to be capable of storing values detected by said detecting means.

5. A video camera system capable of detecting an image pickup direction of a video camera and showing information of the image pickup direction thus detected on a monitor, comprising:
   a) detecting means for detecting the absolute image pickup direction during operation of said video camera;
   b) image forming means for forming image data indicating the absolute image pickup direction together with a movable range of the image pickup direction during the operation of said video camera detected by the detecting means;
   c) memory means for storing data of an image picked up by said video camera when a zooming position of said video camera is set on a wide-angle side; and
   d) combining means for combining the image data formed by said image forming means with the image data stored in said memory means;
   wherein an image formed on the basis of composite image data obtained by said combining means is arranged to be shown on said monitor along with an image obtained by said video camera.

6. A system according to claim 5, wherein said monitor is arranged to be capable of displaying a picture consisting of a main image plane and an auxiliary image plane, to display, on said main image plane, the image obtained by said video camera, and to display, on said auxiliary image plane, the image formed on the basis of the composite image data obtained by said combining means.

7. A video camera system comprising:
   a) a moving mechanism capable of forming a panning operation;
   b) first control means for controlling said moving mechanism;
   c) a video camera mounted on said moving mechanism;
   d) memory means for storing image data representative of an image obtained by said video camera;
   e) image forming means for forming image data indicating an absolute image pickup direction together with a movable range of an image pickup direction during operation of said video camera detected by detecting means; and
   f) combining means for combining the image data stored in said memory means with the image data formed by said image forming means.

8. A system according to claim 7, further comprising a zoom lens mounted on said video camera, and second control means for controlling said zoom lens.

9. A system according to claim 8, wherein said memory means is arranged to store image data which is obtained with said zoom lens set on its wide-angle side.

10. A system according to claim 9, wherein said memory means is arranged to store image data representative of an image obtained when the position of said video camera is at a middle point of a panning angle range within which said video camera can be panned.

11. A system according to claim 7, further comprising analog-to-digital converting means for digitizing an image signal for an image obtained by said video camera, said memory means being arranged to store image data obtained by digitizing said image signal.

12. A system according to claim 11, further comprising digital-to-analog converting means for converting said digitized image signal into an analog image signal, said combining means being arranged to combine the analog image signal obtained by said digital-to-analog converting means with the image data formed by said image forming means.

13. A system according to claim 7, further comprising signal processing means for processing image data obtained by said combining means into a such state as to be able to be displayed on a monitor.

14. A system according to claim 7, further comprising means for combining an image signal obtained from said video camera with an image signal obtained by said combining means.

15. A system according to claim 14, wherein the image signal obtained from said video camera is combined with the image signal obtained by said combining means in a ratio larger than the ratio of the image signal obtained by said combining means.

16. A video conference system comprising:
   a) a video camera for picking up an image of an object and for generating an object image signal representative of the picked-up image;
   b) a camera-moving mechanism for changing an imaging pickup direction of said video camera;
   c) detecting means for detecting the absolute imaging direction during operation of said video camera;
   d) indication signal means for forming a graphic image signal representative of an arrow mark which indicates the absolute imaging direction together with a movable range of the imaging pickup direction during the operation of said video camera detected by the detecting means;
   e) combining means for forming a combined image signal by combining the graphic image signal formed by said indication signal means with the object image signal generated by said video camera; and
   f) means for transmitting and displaying the combined image signal formed by the combining means.

17. A video conference system comprising:
   a) a video camera for picking up an image of an object and for generating an object image signal representative of the picked-up image;
   b) a camera-moving mechanism for changing an imaging pickup direction of said video camera;
   c) detecting means for detecting the absolute imaging direction during operation of said video camera;
   d) indication signal means for forming a graphic image signal representative of a graphic image which indicates the absolute imaging direction together with a movable range of the image pickup direction during the operation of said video camera detected by the detecting means, said graphic image including a segment array,
   e) combining means for forming a combined image signal by combining the graphic image signal formed by said indication signal means with the object image signal generated by said video camera; and
   f) means for transmitting and displaying the combined image signal formed by the combining means.

18. A system according to claim 17, wherein at least one segment of said segment array is colored so that the colored segment is distinguished from at least some other segments of said segment array.

19. A system according to claim 18, wherein a plurality of segments of said segment array are colored so that the colored segments are distinguished from at least some other segments of said segment array.

20. A system according to claim 19, wherein each of the colored segments is indicative of a predetermined direction of orientation of said video camera.

21. A system according to claim 17, wherein said camera-moving mechanism includes means for panning said video camera.

22. A system according to claim 21, wherein said detecting means detects an amount of panning of said video camera.

23. A method for using a video camera system comprising the steps of:
   a) detecting by means of detecting means an image pickup direction during operation of a video camera;
   b) forming by means of image forming means image data indicating the absolute image pickup direction together with a movable range of the image pickup direction during the operation of said video camera detected by the detecting means; and
   c) combining by means of combining means the image data indicating the absolute image pickup direction with data of an image of an object picked up by said video camera.

24. A method for using a camera system comprising the steps of:
 a) detecting by means of detecting means an image pickup direction during operation of a video camera;
 b) storing by means of a memory a value of the absolute image pickup direction detected during said detecting step by said detecting means;
 c) forming by means of image forming means image data indicating the absolute image pickup direction together with a movable range of the image pickup direction during the operation of said video camera detected by the detecting means; and
 d) combining by means of combining means the image data indicating the absolute image pickup direction together with a movable range of the image pickup direction and formed during the forming step by said image forming means with data of an image of an object picked up by said video camera.

25. A method for using a video camera system capable of detecting an image pickup direction of a video camera and showing information of the absolute image pickup direction together with a movable range of the image pickup direction thus detected on a monitor, comprising the steps of:
 a) detecting by means of detecting means the absolute image pickup direction during operation of said video camera;
 b) forming by means of image forming means image data indicating the absolute image pickup direction together with a movable range of the image pickup direction during the operation of said video camera detected by the detecting means;
 c) storing by means of memory means data of an image picked up by said videos camera when a zooming position of said video camera is set on a wide-angle side; and
 d) combining by means of combining means the image data formed during said forming step by said image forming means with the image data stored during said storing step in said memory means, wherein an image formed on the basis of composite image data obtained by said combining means is arranged to be shown on said monitor along with an image obtained by said video camera.

26. A method for using a video camera system comprising the steps of:
 a) storing by means of memory means image data representative of an image obtained by said video camera;
 b) forming by means of image forming means image data indicating an absolute image pickup direction together with a movable range of an image pickup direction during operation of said video camera detected by detecting means; and
 c) combining by means of combining means the image data stored during said storing step in said memory means with the image data formed during said forming step by said image forming means.

* * * * *

UNITED STATES PATENT AND TRADEMARK OFFICE
CERTIFICATE OF CORRECTION

PATENT NO. : 6,449,011 B1
DATED : September 10, 2002
INVENTOR(S) : Mizuki Muramatsu et al.

It is certified that error appears in the above-identified patent and that said Letters Patent is hereby corrected as shown below:

<u>Column 3,</u>
Line 46, delete "within conference" and insert -- within a conference --.

Signed and Sealed this

Sixteenth Day of September, 2003

JAMES E. ROGAN
*Director of the United States Patent and Trademark Office*